United States Patent
Sakraschinsky et al.

(10) Patent No.: US 6,620,316 B1
(45) Date of Patent: Sep. 16, 2003

(54) MODULAR SYSTEM FOR PUTTING TOGETHER DIFFERENT SIZED FILTER ELEMENTS

(75) Inventors: Michael Sakraschinsky, St. Ingert (DE); Stefan Hennes, Neunkirchen (DE)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 0 days.

(21) Appl. No.: 09/719,087

(22) PCT Filed: Mar. 19, 1999

(86) PCT No.: PCT/EP99/01829
§ 371 (c)(1),
(2), (4) Date: Feb. 15, 2001

(87) PCT Pub. No.: WO99/64133
PCT Pub. Date: Dec. 16, 1999

(30) Foreign Application Priority Data

Jun. 10, 1998 (DE) .......................................... 198 26 032

(51) Int. Cl.$^7$ ......................... B01D 27/06; B01D 27/08; B01D 29/15
(52) U.S. Cl. ....................... 210/130; 210/232; 210/238; 210/323.2; 210/335; 210/488; 285/336; 285/370; 285/371; 277/612; 277/649; 277/918
(58) Field of Search ................................. 210/130, 232, 210/488, 238, 322, 323.2, 335; 277/612, 649, 918; 285/336, 370, 371

(56) References Cited

U.S. PATENT DOCUMENTS

| 3,246,920 A | 4/1966 | Pall |
| 5,601,711 A | 2/1997 | Sklar et al. ............. 210/238 |

FOREIGN PATENT DOCUMENTS

| DE | 1902 534 | 10/1964 |
| DE | 39 21 369 | 1/1990 |
| EP | 0 487 831 | 6/1992 |
| EP | 0 769 317 | 7/1997 |

OTHER PUBLICATIONS

PTO 02–4997–Translation of EPO 0 769 317 A1, Filter Cartridge with Rigid Tubular Core, Guy Villette et al., published on Apr. 23, 1997.*
Translation of International Preliminary Examination Report (PCT/IPEA/409) PCT/EP99/01829.
Notification of Transmittal of Copies of Translation of the International Preliminary Examination Report (PCT/IB/338)PCT/EP99/01829.

* cited by examiner

Primary Examiner—David A. Reifsnyder
(74) Attorney, Agent, or Firm—Smith, Gambrell & Russell, LLP

(57) ABSTRACT

A modular system for putting together different sized filter elements, especially filter elements having different lengths, more particularly filter devices for hydraulic fluids, comprising a support tube that defines an inner cavity in the corresponding filter element, said tube being surrounded by a filter mat that is substantially cylindrical and that matches the different dimensions and having passages to let the fluid pass through. The filter elements also contain at least one coupling member enabling connection on the end side of a corresponding support tube to an additional support tube having a location on the end side for interacting with and locking on the coupling member. Each coupling member is embodied as an attachment plug element with a crown consisting of interspaced tabs extending in axial direction and hooks for snapping on the location of the attached support tube.

18 Claims, 3 Drawing Sheets

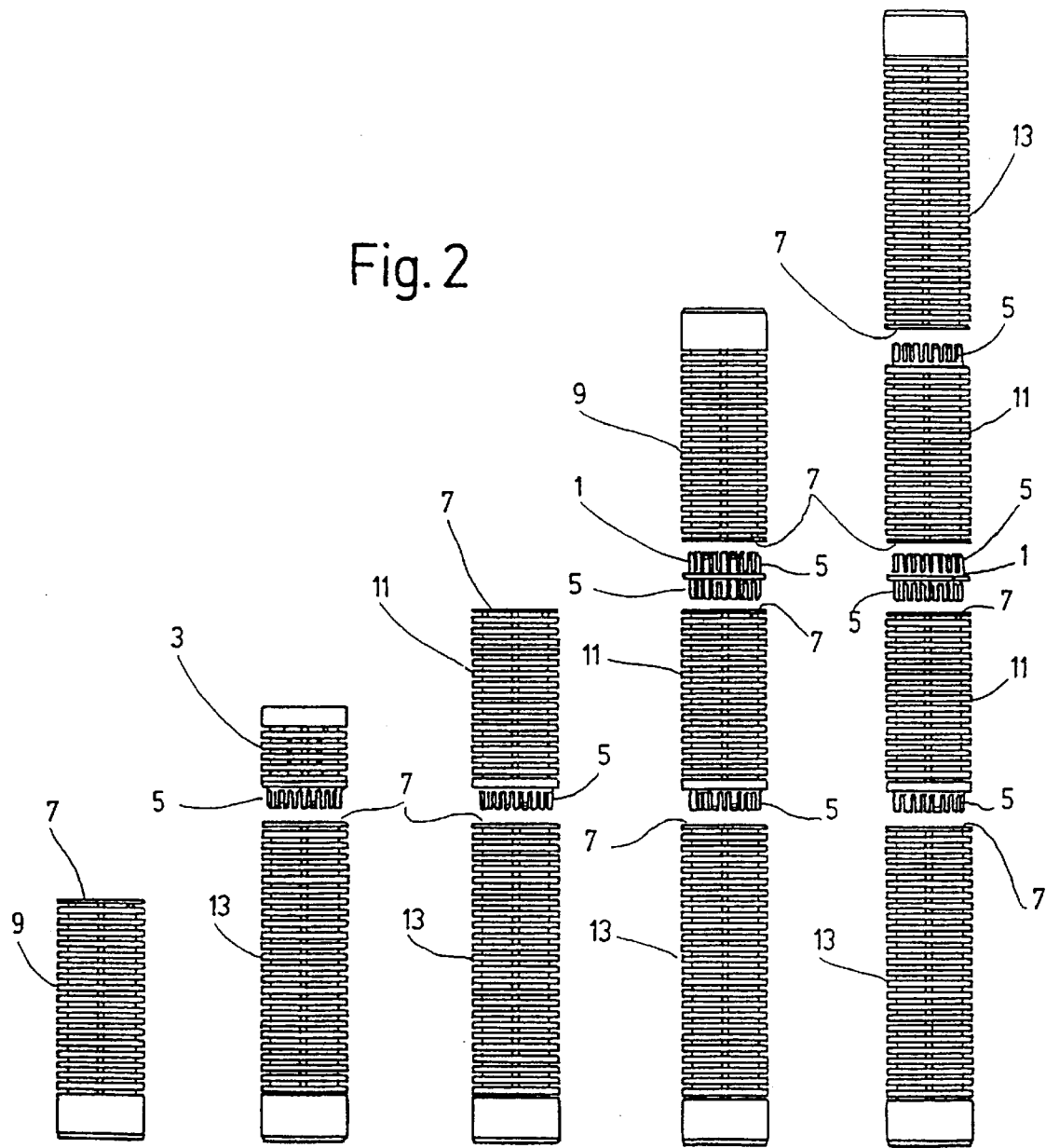

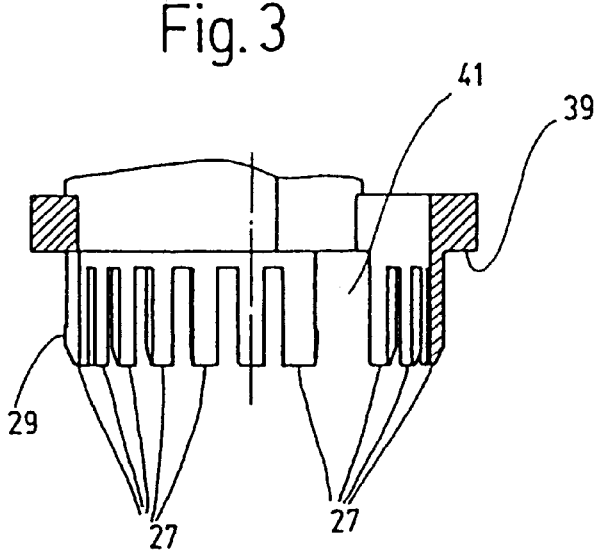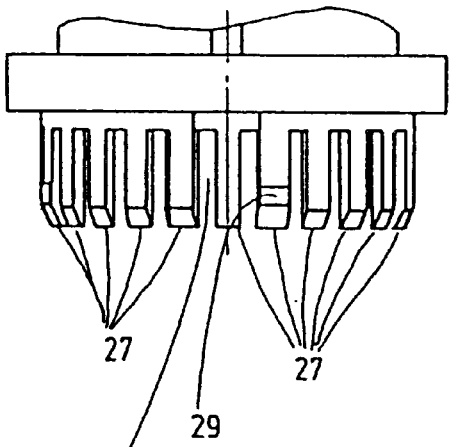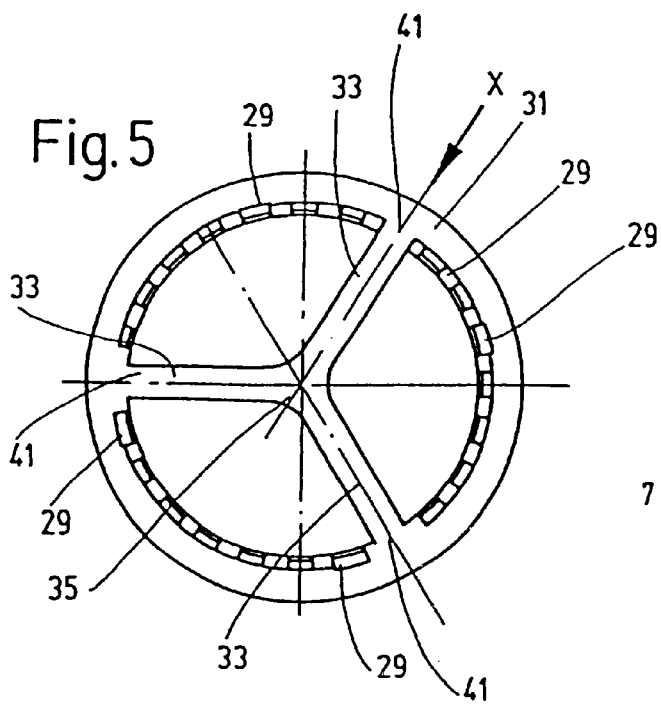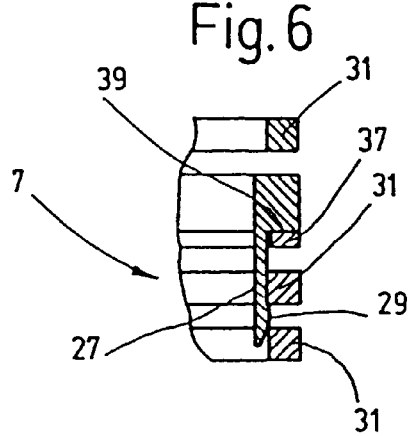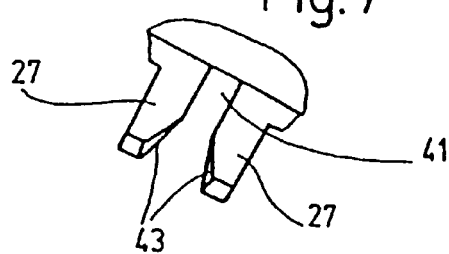

MODULAR SYSTEM FOR PUTTING TOGETHER DIFFERENT SIZED FILTER ELEMENTS

Figure 1:
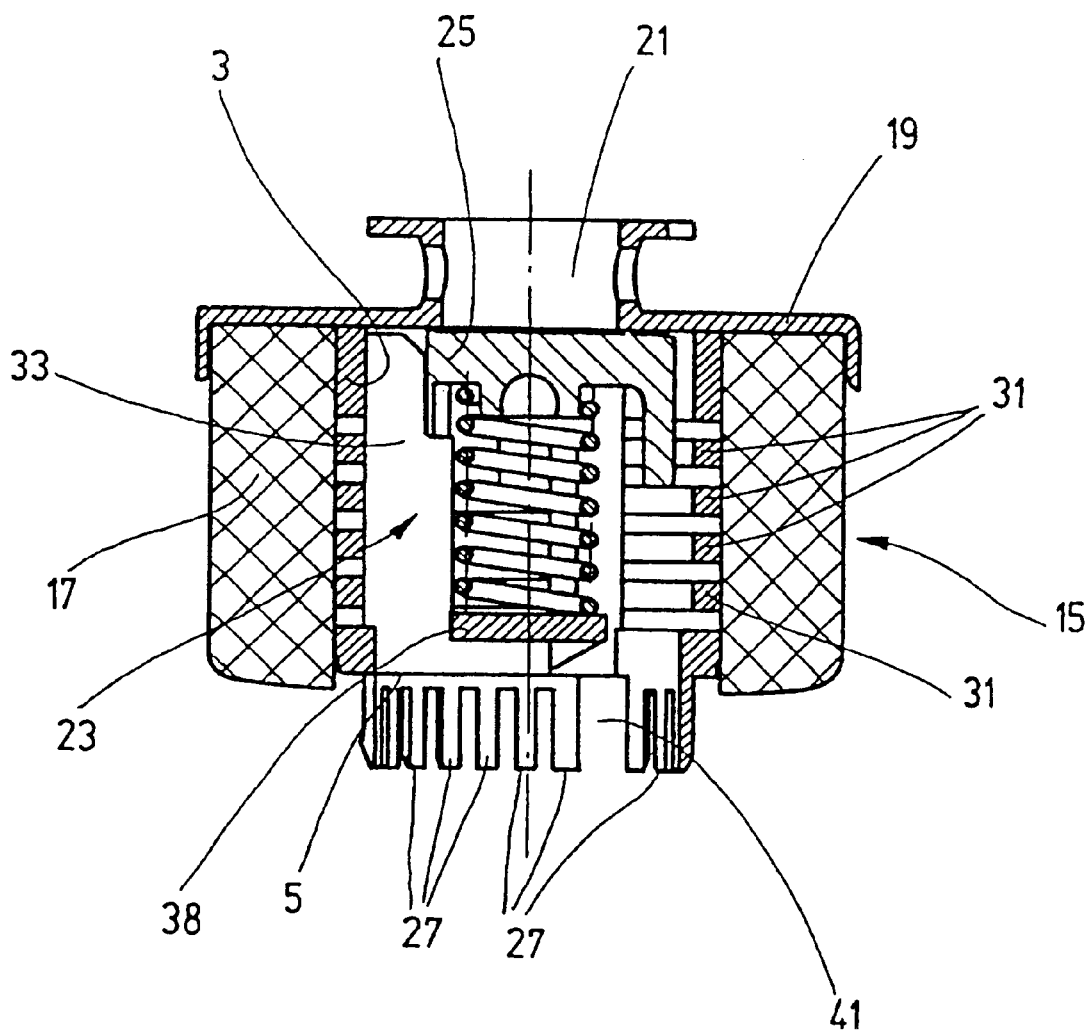

The invention refers to a modular system for the assembly of filter elements of different structural sizes, in particular, construction lengths, namely with filter devices for hydraulic fluids, with a supporting tube, which defines an interior cavity of the pertinent filter element, a supporting tube with filter mat, which has passages to permit the fluid to pass through, and whose jacket is formed by circular rings, arranged at mutual intervals from one another, which are carried by the vanes of a star-shaped profile body, extending axially in the interior of the supporting tube, and with at least one coupling piece, which makes possible the end connection of one pertinent supporting tube to another supporting tube, which has a holder, intended for an end, for the interaction and locking with the coupling piece, which is shaped as a plug element with a ring, which consists of fingers, that extend in an axial direction at mutual intervals, and which has hooks formed at the end to snap on at the holder of the following supporting tube.

A system of this type is already known from EP 0769 317 A1. The goal of the invention is to create a system of the aforementioned type, which is characterized by particularly good operating characteristics, namely, improved structural strength of the assembly of coupled supporting bodies.

The goal of the invention is to create a modular system of the type under discussion, which is easy to handle and inexpensively produced.

In a modular system of the initially mentioned type, this goal is attained in accordance with the invention in that the ring, consisting of fingers, oriented to the vanes of the profile body, has widened gaps between adjacent fingers, and these gaps make possible the engagement of the ends of the vanes.

Owing to the shape of the ring, consisting of fingers carrying snap hooks, in accordance with the invention, the ends of the vanes of the interior profile bodies, which engage the gaps between the fingers when the connection is set up, come into correct position relative to one another immediately. A full support surface, extending over the entire cross section of the profile body is therefore available, by means of which the axial forces acting on the filter element during operation can be transferred, so that the desired high structural strength of the assembled filter element is produced.

With the modular system in accordance with the invention, supporting tubes with a holder, intended for one end, for the interaction and locking with the coupling piece can be used. Likewise, supporting tubes, which have a holder for the interaction and locking with a coupling piece at each end, can be taken into consideration as components of the modular system. Moreover, supporting tubes with only one coupling piece, affixed to the end and supporting tubes with a coupling piece affixed to each of its two ends are provided.

Also, a coupling piece in the form of a special adapter can be provided, which is intended to interact and lock with a holder on each of the supporting tubes to be connected to one another.

The modular system, in accordance with the invention, thus opens up diverse combination possibilities for the assembly of filter elements of the required size.

The invention is explained in detail below, with the aid of embodiment examples represented in the drawing:

FIG. 1, a longitudinal section of the upper end of a filter element, depicted partially broken off, with a bypass valve used in the interior of its supporting tube;

FIG. 2, a schematic representation of supporting tubes, in part with various structural lengths, and of coupling pieces, by means of which the supporting tubes are affixed one to another;

FIG. 3, a longitudinal section of a coupling piece, shaped on one end of a supporting tube in the form of a plug element, which is depicted broken off an on an enlarged scale;

FIG. 4, a side view of the plug element of FIG. 3;

FIG. 5, a lower view of the plug element of FIGS. 3 and 4, shaped on the end of the supporting tube;

FIG. 6, a partial longitudinal section of a finger of the plug element of FIGS. 3 and 4, which is depicted broken off, with a snap hook engagement with a ring on a plug holder of another supporting tube; and FIG. 7, partial view of the plug element, which is depicted broken off and enlarged, seen in the observation direction designated by X in FIG. 5.

FIG. 2 shows, in schematic representation, components of the modular system, in accordance with the invention. This system comprises parts in the form of supporting tubes of various structural lengths with coupling pieces and/or coupling-piece holders on the ends, injection-molded from polyamide plastic (PA 6), and coupling pieces in the form of adapters, separated from the supporting tubes; said adapters are designated by reference number 1. Reference number 3 designates supporting tubes of a short structural length with a coupling piece 5 on one end. Supporting tubes of longer structural length and with a coupling piece-holder 7 on one end are designated by reference number 9. On the other hand, supporting tubes of somewhat shorter structural length and a coupling piece 5 on one end and a coupling-piece holder 7 on the opposite end are designated by reference number 11. Reference number 13 characterizes supporting tubes and in contrast, a greater length with a coupling-piece holder 7 on the end.

FIG. 1 shows, in larger representation, the supporting tube 3, associated with the upper end of a filter element 15 and surrounded by the upper part of the pertinent filter mat 17. A lid 19, which forms the upper seal and which is also injection-molded from the same plastic as the supporting tube 3, overlaps the upper edge of the filter mat 17, is welded with the end edge of the supporting tube 3, and forms a central inlet 21 for the fluid entry to a bypass valve 23, integrated with the interior cavity of the supporting tube 3, whose valve body 25 normally provides a sealing on the lid 19, under spring tension against the edge of the inlet 21.

As can be seen from FIG. 1, the coupling piece 5, formed on the end of the supporting tube 3, is shaped as a plug element in the same way as the coupling pieces 5 of the supporting tubes 11 and the coupling pieces 5 formed on both sides on the adapter 1; the plug element is formed from a circular ring, consisting of fingers 27, which extend axially and, in part, have various widths, of which the wider finger 27 are provided with snap hooks 29, which project radially to the outside (see FIGS. 3 to 6).

As can be seen most clearly from FIGS. 2 and 6, the jacket of the supporting tubes 3, 9, 11, and 13 consists of a series or rings 31, which are arranged at axial intervals from one another, so that passages are formed to permit the fluid to pass. As FIG. 5 shows, the rings 31, in supporting tubes 9, 11, and 13, are carried by the ends of the vanes 33 of a star-like profile body 35, which extends axially in the interior of the supporting tube in question. In the short supporting tube 3, as shown in FIG. 1, the bypass valve 23 forms, with its base 38, a part of the interior profile 35—more precisely, this base 38 forms the limit of a recess in the interior area of the vanes 33, in which the bypass valve 23 is held.

The interior side of the tube jacket of the supporting tube in question 9, 11, or 13 is used to form the coupling-piece holder 7—that is, as a holder for the inserted ring of the fingers 27 of the plug element, wherein the ring 37 on the end, defining the tube jacket has an axial extension, which is reduced in comparison to the other rings 31. The length of the fingers 27 of the plug element, measured by a shoulder surface 39 (FIG. 3) is dimensioned on the basis of the finger 27 in such a way that the snap hooks 29, in the state of their insertion into the holder 7, snap behind the next ring 31, and the shoulder surface 39 is adjacent to the end ring 37 (see FIG. 6).

As can be seen, in particular, from FIGS. 3, 5, and 7, there are three enlarged gaps 41 between adjacent fingers 27 of the ring, consisting of fingers 27. These gaps 41 are oriented towards the radial vanes 33 of the interior profile body 35. The assembly of the plug element and the holder 7 ensures that the end surfaces of the vanes 33 of the interior profile bodies 35 and the adjacent supporting tubes are aligned and thus correctly positioned, so that axial forces are transferred from supporting tube to supporting tube via the interior profile bodies 35. As can be seen from FIG. 7, the fingers 27 on one of the widened gaps 41 have lateral bevelings 43 as an insertion aid during the assembly of the components.

As can be seen from FIG. 2, a variety of combination possibilities for the formation of desired supporting tube lengths, perhaps with the bypass valve 23, integrated into the supporting tube, result with the components of the modular system, in accordance with the invention. The coupling pieces in the form of the adapter 1, which have a plug element with a ring, consisting of fingers 27 on both sides, make possible the mutual connection with opposing holders 7, whereas the supporting tubes 3 and 11 with a coupling piece formed on the end are intended for interaction with the end of a following supporting tube 9 or 13 shaped as a holder 7.

What is claimed is:

1. A modular system for the assembly of filter elements of different structural sizes, comprising a supporting tube which defines an interior cavity of a filter element and carries a filter mat which has passages to permit fluid to pass through, and a jacket formed by a plurality of circular rings, arranged at mutual intervals from one another, which rings are carried by vanes of a star-shaped profile body extending axially in the interior cavity of the supporting tube, and having a coupling piece which makes possible an end connection of one supporting tube with another adjacent supporting tube, which has a holder intended for one end for interaction and locking with a coupling piece, which is shaped as a plug element with a ring consisting of a plurality of fingers that extend in an axial direction at mutual intervals and that have a plurality of hooks formed on an end of said tube to snap on at the holder of the adjacent and waiting supporting tube, wherein each of said rings consisting of fingers has widened gaps between adjacent fingers which are oriented toward the vanes of the profile body whereby these gaps make possible the engagement of ends of the vanes.

2. The modular system according to claim 1, further comprising said supporting tube having a holder for the interaction and locking with a coupling piece on each end of said tube.

3. The modular system according to claim 2, wherein coupling pieces are arranged on a separate adapter which is provided for interaction and locking with a holder on supporting tubes which are to be connected to one another.

4. The modular system according to claim 3, wherein supporting tubes with a coupling piece or a holder and with a base of a bypass valve formed in the opposite end area in the interior of the tube, are provided.

5. The modular system according to claim 2, wherein each supporting tube is shaped as a one-piece injection-molded article of plastic.

6. The modular system according to claim 2, wherein supporting tubes with a coupling piece or a holder and with a base of a bypass valve formed in the opposite end area in the interior of the tube, are provided.

7. The modular system according to claim 1, wherein each supporting tube is provided with a coupling piece affixed to one of its ends.

8. The modular system according to claim 7, wherein coupling pieces are arranged on a separate adapter which is provided for interaction and locking with a holder on supporting tubes which are to be connected to one another.

9. The modular system according to claim 7, wherein each supporting tube is shaped as a one-piece injection-molded article of plastic.

10. The modular system according to claim 7, wherein supporting tubes with a coupling piece or a holder and with a base of a bypass valve formed in the opposite end area in the interior of the tube, are provided.

11. The modular system according to claim 1, wherein a supporting tube is provided with a coupling piece affixed to each of its two ends.

12. The modular system according to claim 11, wherein each supporting tube is shaped as a one-piece injection-molded article of plastic.

13. The modular system according to claim 11, wherein supporting tubes with a coupling piece or a holder and with a base of a bypass valve formed in the opposite end area in the interior of the tube, are provided.

14. The modular system according to claim 1, wherein coupling pieces are arranged on a separate adapter which is provided for interaction and locking with a holder on supporting tubes which are to be connected to one another.

15. The modular system according to claim 14, wherein each supporting tube is shaped as a one-piece injection-molded article of plastic.

16. The modular system according to claim 14, wherein supporting tubes with a coupling piece or a holder and with a base of a bypass valve formed in the opposite end area in the interior of the tube, are provided.

17. The modular system according to claim 1, wherein each supporting tube is shaped as a one-piece injection-molded article of plastic.

18. The modular system according to claim 1, wherein supporting tubes with a coupling piece or a holder and with a base of a bypass valve formed in the opposite end area in the interior of the tube, are provided.

* * * * *